Sept. 18, 1962 W. LEHMANN 3,054,919
METHOD OF IMPROVING ELECTROLUMINESCENT PHOSPHOR
AND ELECTROLUMINESCENT DEVICE
Filed Dec. 24, 1959

INVENTOR.
WILLI LEHMANN.
BY
W. D. Palmer
ATTORNEY.

3,054,919
Patented Sept. 18, 1962

3,054,919
METHOD OF IMPROVING ELECTROLUMINESCENT PHOSPHOR AND ELECTROLUMINESCENT DEVICE
Willi Lehmann, Livingston, N.J., assignor to Westinghouse Electric Corporation, East Pittsburgh, Pa., a corporation of Pennsylvania
Filed Dec. 24, 1959, Ser. No. 861,849
10 Claims. (Cl. 313—108)

This invention relates to a method for improving electroluminescent phosphor and, more particularly, to a method for improving the efficiency of electroluminescent phosphor and to an electroluminescent device which incorporates such improved phosphor.

The phenomenon of electroluminescence was first disclosed by G. Destriau, one of his earlier publications appearing in London, Edinburgh and Dublin Philosophical Magazine, Series 7, Volume 38, No. 285, pages 700–737 (October 1947). Since this early publication, electroluminescent devices have been marketed commercially. The efficiency of devices incorporating electroluminescent phosphor has not been as good as desired, sometimes resulting in undesired heating during operation. In addition, the efficiency of electroluminescent phosphor has varied considerably and an electroluminescent lamp made on one day will often display a different efficiency from an apparently identical lamp made on another day with phosphor taken from the same original batch.

It is the general object of this invention to avoid and overcome the foregoing and other difficulties of and objections to prior-art practices by the provision of a method for improving the efficiency of electroluminescent phosphor.

It is a further object to provide a method for processing electroluminescent phosphor so that the efficiency of a device incorporating such phosphor can be duplicated.

It is an additional object to provide an electroluminescent device having improved efficiency and wherein the phosphor used in the device has been processed in accordance with an improved method.

It is another object to provide process details for improving the efficiency of electroluminescent phosphor principally comprising zinc sulfide and including copper as primary activator.

The aforesaid objects of the invention, and other objects which will become apparent as the description proceeds, are achieved by providing a method for increasing the efficiency of electroluminescent phosphor wherein the phosphor is first substantially dried. Thereafter there is mixed in intimate contact with the phosphor a predetermined amount of substantially-dry, finely-divided, white, chemically-basic and water-sorptive material which has an electrical conductivity, both with and without combined water, which is less than the electrical conductivity of zinc sulfide. The phosphor and mixed material are then maintained under substantially moisture-free conditions until the phosphor and mixed material are incorporated into an electroluminescent device.

For a better understanding of the invention, reference should be had to the accompanying drawing wherein.

Figure 1:
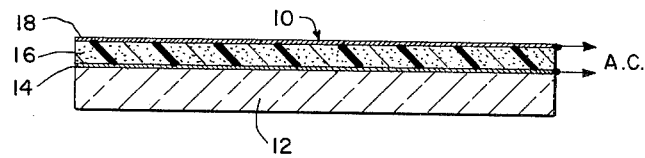
FIG. 1 is a sectional-elevational view of an electroluminescent lamp incorporating phosphor processed in accordance with this invention.

With specific reference to the form of the invention illustrated in the drawing, in FIG. 1 is illustrated an electroluminescent lamp 10 which generally comprises a glass foundation 12 having coated thereon a first electrode 14 which is formed of light-transmitting electrically-conducting tin oxide. Coated over the electrode 14 is a layer 16 comprising electroluminescent phosphor which has been processed in accordance with the present invention and over the layer 16 is a second electrode 18 which is formed of vacuum-metallized aluminum or light-transmitting copper iodide for example. An alternating potential is adapted to be applied between the electrodes 14 and 18 in order to energize the electroluminescent phosphor to light emission.

The tin oxide electrode 14 can be formed of other suitable light-transmitting, electrically-conducting material such as indium or titanium oxides or copper iodide. In this specific example, the phosphor, which has been processed as explained hereinafter, is mixed with equal parts by weight of a light-transmitting dielectric such as polyvinyl-chloride acetate and the thickness of the layer 16 is approximately 2 mils. The thickness of the layer 16 is not critical and can be varied considerably. If desired, a separate layer of dielectric can be included between the lamp electrodes 14 and 18 or the dielectric can be dispensed with entirely and powdered phosphor compacted between the two electrodes of the lamp without any admixed dielectric. Either or both of the electrodes 14 or 18 can be replaced by a mesh of wires or the electrodes for the lamp 10 can be formed as an interlacing mesh of wires with phosphor therebetween, as disclosed in U.S. Patent No. 2,684,450, dated July 20, 1954.

The electroluminescent phosphor comprising the layer 16 is first prepared in accordance with conventional practices which include firing at a predetermined temperature and for a predetermined time a mixture comprising zinc sulfide, copper salt and either a halide or a salt of a three-valent metal or both. The zinc sulfide constituent forms the phosphor matrix and to the best of present knowledge, the copper salt provides the primary activator while the halide or three-valent metal salt provides the coactivator. Suitable coactivators for copper-activated zinc sulfide phosphor are chlorine, bromine, iodine, aluminum, scandium, gallium or indium, or any mixtures thereof. As an example, the copper activator is added to the raw mix in such amount as to constitute from 0.1 to 10 mol percent of the zinc sulfide and the total activator is present in the raw mix in amount of from 0.01 to 10 gram-atom percent of the zinc. The preferred phosphor coactivator is chlorine. Reference is made to U.S. Patent No. 2,874,128, dated February 17, 1959, for details for preparing copper-activated zinc sulfide phosphor which is coactivated by chlorine. By way of further example, zinc sulfide in amount of 10 grams is mixed with 0.2 mol percent of copper as acetate and 0.13 gram-atom percent of chlorine as ammonium chloride. To this is added 5% by weight of the raw mix of elemental sulphur. The mixture is fired in a nitrogen atmosphere and a partially-closed container at a temperature of 950° C. for ninety minutes. Desirably, the phosphor is refired in a similar manner. After the phosphor is prepared by firing, it is desirably washed in a solution which is a solvent for cuprous sulfide, but which is not a solvent for zinc sulfide, in order to remove excess cuprous sulfide from the surface of the prepared phosphor. As a specific example, the fired phosphor is washed in a one-normal solution of sodium, potassium or ammonium cyanide, thiosulphate or thiocyanate, or any mixtures of the foregoing. The preferred washing solution is a basic solution of sodium cyanide. The concentration of the washing solution is not critical and can vary over a wide range. After washing, the phosphor is water rinsed and then dried by heating to an elevated temperature such as 120° C. in order to substantially dry the phosphor. This drying temperature is subject to variation.

Other group II B metal sulfides can be substituted for a part of the zinc sulfide. As an example, a small amount of cadmium sulfide can be substituted for a part of the zinc sulfide. Also, some of the zinc sulfide can be replaced by mercuric sulfide or a mixture of cadmium and mercuric sulfides, as disclosed in copending application S.N. 807,730, filed April 20, 1959, and owned by the present assignee, now abandoned. Other activators such as manganese or lead can be used to supplement the primary copper activator and such electroluminescent phosphors are well known. Any of the foregoing electroluminescent phosphors can be improved by processing in accordance with the present invention.

In accordance with the present invention, the substantially dry phosphor is intimately mixed with a predetermined amount of selected additive material as specified hereinafter. Alternatively, if the phosphor after preparation has been re-exposed to moisture, it is again dried before mixing with the selected additive material. Such additional phosphor drying is readily accomplished by heating the phosphor in a manner as indicated hereinbefore. The additive material is preferably mixed with the phosphor immediately after the drying step although the phosphor after drying can be stored under substantially moisture-free conditions until it is to be mixed with the selected additive material. After mixing, the phosphor and mixed material should be maintained under substantially moisture-free conditions until incorporation into an electroluminescent device. The selected material which is mixed with the phosphor is substantially-dry, finely-divided, white, chemically-basic and water-sorptive and has an electrical conductivity, both with and without combined water, which is less than the electrical conductivity of the zinc sulfide which comprises the phosphor matrix. The preferred materials with which the phosphor is mixed are barium carbonate, cadmium carbonate or magnesium oxide, or any mixtures thereof. Other materials with which the phosphor can be mixed are barium oxide, magnesium carbonate or sodium carbonate, or any mixtures thereof, although these last-listed materials are not as effective as the preferred indicated materials. The actual state of division of the finely-divided mixed material is not critical and can vary over a wide range. Preferably the mixed material has an average particle size which is less than the average particle size of the phosphor in order to obtain a more intimate contact with the phosphor, although good results have been obtained even where the average particle size of the mixed material is somewhat larger than that of the phosphor. As an example, zinc sulfide electroluminescent phosphor normally has an average particle diameter in the order of about 10 microns. Selective additive materials of cadmium carbonate having an average particle size of about one micron or smaller and magnesium oxide having an average particle size slightly larger than that of the phosphor both act to increase the efficiency of electroluminescent devices. The selected additive material should also be substantially dry when mixed with the phosphor so that the additive material has a great affinity for any moisture which remains on the surface of the phosphor. To prevent any appreciable loss of light, the additive material should be substantially colorless so that no additional spectral absorption bands will be introduced. A colorless material when in very finely-divided form will have a white appearance. The mixed additive material is also chemically basic in nature so that it will combine with any hydrogen ions which are present on the surface of the phosphor. An additional requirement for the mixed additive material is an electrical conductivity which is less than that of zinc sulfide so that the mixed material will not introduce any appreciable electrical losses when the mixed material and phosphor are later incorporated in an electroluminescent device.

Figure 2:
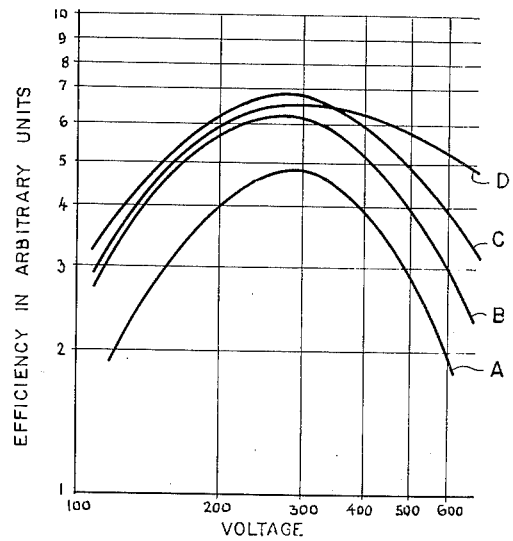
FIG. 2 is a graph of efficiency versus volts showing the improved efficiency which is realized with phosphor processed in accordance with this invention.

In FIG. 2 is shown a graph of efficiency, expressed in arbitrary units, versus applied field, expressed in terms of voltage. The phosphor used in taking these efficiency curves was the foregoing specific zinc sulfide activated by copper and coactivated by chlorine. In taking these curves, the phosphor immediately after drying was mixed with the indicated amounts of each of the preferred additive materials. Two parts by weight of the phosphor were then suspended in one part by weight of castor oil dielectric and the phosphor and mixed dielectric incorporated into similar electroluminescent lamps for test. The electrode spacing in the test lamps was eighty microns and an additional layer of six-micron-thick separate dielectric material was included between the lamp electrodes to inhibit any tendencies for electrical breakdown. The resulting curves were substantially the same for equal additions of each preferred additive material. In the curve designated A is plotted the efficiency performance for a control lamp incorporating the phosphor to which none of the indicated material was ever added. The curve designated B represents the resulting efficiency for 0.1% by weight of any of the preferred materials added to the phosphor, in accordance with the present invention. In the curve designated C, 1% by weight of preferred additive material was used. In the curve designated D, 10% by weight of preferred additive material was used. The percent by weight of the additive material is not critical and as shown in these curves, there is very little difference in resulting efficiency with an addition of from 0.1% and 10% by weight of the phosphor of any of the indicated additive materials. As a practical matter, it is desirable to add at least 0.05% by weight of the phosphor of any of the indicated additive materials and it is desirable not to exceed 25% by weight of the phosphor since the amount of phosphor which can be placed into the electroluminescent device will be correspondingly decreased, with a resulting decrease in overall brightness. Even the foregoing indicated range of material additions can be extended, however, and the efficiency of the phosphor will still be improved. A material addition in amount of about 1% by weight of the phosphor is very satisfactory.

Figure 3:
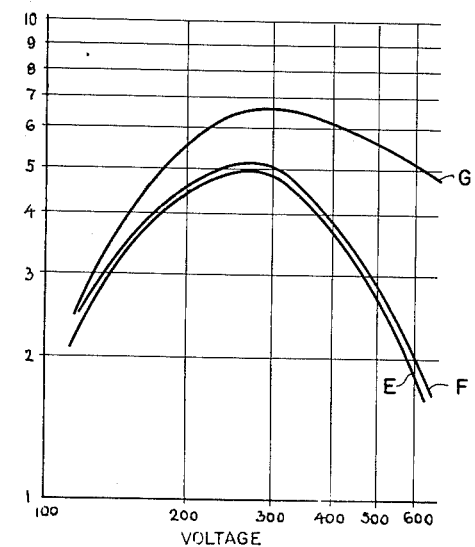
FIG. 3 is a graph of efficiency versus applied volts showing the efficiency performance realized from an electroluminescent device incorporating phosphor processed in accordance with the present invention, as compared to an otherwise similar device incorporating phosphor processed in accordance with prior-art practices.

In FIG. 3 is shown a graph of efficiency in arbitrary units versus applied field, as expressed in volts. The test lamps used in taking these curves were of the same construction as the test lamps used in taking the curves shown in FIG. 2 although the phosphor was slightly modified. In the curve designated E is shown the efficiency performance of an electroluminescent lamp wherein a copper-activated zinc sulfide phosphor was mixed with castor oil dielectric. In the curve designated F, 0.5% by weight of cadmium carbonate was mixed directly with the castor oil dielectric and the phosphor then added thereto. In the curve designated G, an equivalent amount of cadmium carbonate was mixed directly with the phosphor after it was dried, in accordance with the present invention. As shown in FIG. 3, the performance of the test lamps was equivalent when no additive was used and when the additive material was added directly to the dielectric. Only when the additive material is added to the phosphor in accordance with the present invention is an increased efficiency realized. Apparently moisture combined in any way with the phosphor acts to affect the resulting lamp efficiency in a deleterious manner. Where the phosphor is mixed with the additive material in accordance with the present invention, however, the deleterious effects of the moisture are substantially eliminated.

The present increase in efficiency is realized at both low frequency and high frequency operation. In control tests, equivalent gains in efficiency were obtained with a frequency of operation of 60 cycles per second and with a frequency of operation of 10,000 cycles per second. In addition, the efficiency of electroluminescent devices incorporating the same phosphor processed in accordance with the present invention can be substantially predicted and duplicated.

The best efficiency for electroluminescent devices incorporating phosphor processed in accordance with the present invention is realized when the phosphor and mixed material are held or stored after mixing under substantially moisture-free conditions for a prolonged period of time. In the curves shown in FIG. 2, the phosphor and mixed material were stored for one week under substantially moisture-free conditions before the phosphor and mixed material were incorporated into an electroluminescent device. Lamps incorporating phosphor processed in accordance with the present invention will also display increased efficiency when the phosphor and mixed material are not stored before the phosphor and mixed material are incorporated into an electroluminescent device. Apparently it is not possible to remove substantially all of the moisture from the phosphor by a mere drying procedure. By mixing the indicated additive materials with the phosphor, however, additional amounts of moisture are removed from the surface of the phosphor. If the phosphor is mixed with the indicated material immediately after drying and then incorporated into an electroluminescent lamp, an increase in maximum efficiency in the order of about 10–15% is normally realized. If the phosphor and mixed material are stored under substantially moisture-free conditions for about one day before incorporation into an electroluminescent device, a further efficiency increase of about 10% and sometimes higher is normally realized. If the phosphor and mixed material are stored under substantially moisture-free conditions for about one week before incorporation into an electroluminescent device, another 10% increase in efficiency is normally realized. Such a prolonged holding or storage period apparently serves to dry the phosphor even more. The foregoing increases in maximum efficiency will vary with the phosphor and construction of the device incorporating the phosphor, but are representative of the efficiency increases which are realized in the usual case.

It will be recognized that the objects of the invention have been achieved by providing a method for improving and duplicating the efficiency of electroluminescent phosphor. There have also been provided process details for improving the efficiency of electroluminescent phosphor principally comprising zinc sulfide and including copper as primary activator and an electroluminescent device incorporating such processed phosphor.

While best embodiments of the invention have been illustrated and described in detail, it is to be particularly understood that the invention is not limited thereto or thereby.

I claim:

1. An electroluminescent device comprising, spaced electrodes, material between said electrodes comprising electroluminescent phopshor, said phosphor principally comprising zinc sulfide and including copper as activator and having been additionally processed after initial preparation and until incorporation into said device by the method comprising: substantially drying said phosphor; mixing in intimate contact with said phosphor a predetermined amount of substantially-dry, finely-divided, white, chemically-basic and water-sorptive material having an electricial conductivity, both with and without combined water, which is less than the electrical conductivity of zinc sulfide; and maintaining said phosphor and material mixed therewith under substantially moisture-free conditions until said phosphor and material mixed therewith are incorporated into said electroluminescent device.

2. The method of processing finely divided electroluminescent phosphor principally comprisnig zinc sulfide and including copper as activator, after initial preparation and until incorporation into an electroluminescent device, in order to increase the efficiency of the electroluminescent device incorporating the processed phosphor, which method comprises: mixing in intimate contact with said phosphor after initial preparation and when in a substantially dry condition, a predetermined amount of substantially dry, finely divided, white, chemically basic and water-sorptive material having an electrical conductivity, both with and without combined water, which is less than the electrical conductivity of zinc sulfide; maintaining said substantially dry phosphor and material mixed therewith under substantially moisture-free conditions; and incorporating said substantially dry phosphor and material mixed therewith into said electroluminescent device.

3. The method of processing finely divided electroluminescent phosphor principally comprising zinc sulfide and including copper as activator, after initial preparation and until incorporation into an electroluminescent device, in order to increase the efficiency of the electroluminescent device incorporating the processed phosphor, which method comprises: substantially drying said phosphor; mixing in intimate contact with said phosphor a predetermined amount of substantially dry, finely divided, white, chemically basic and water-sorptive material having an electrical conductivity, both with and without combined water, which is less than the electrical conductivity of zinc sulfide; maintaining said substantially dry phosphor and material mixed therewith under substantially moisture-free conditions for a prolonged period of time; and incorporating said substantially dry phosphor and material mixed therewith into said electroluminescent device.

4. The method of processing finely divided copper-activated zinc sulfide electroluminescent phosphor after initial preparation and until incorporation into an electroluminescent device, in order to increase the efficiency of the electroluminescent device incorporating the processed phosphor, which method comprises: substantially drying said phosphor; mixing in intimate contact with said phosphor a predetermined amount of substantially dry, finely divided, white, chemically basic and water-sorptive material having an electrical conductivity, both with and without combined water, which is less than the electrical conductivity of zinc sulfide; maintaining said substantially dry phosphor and material mixed therewith under substantially moisture-free conditions; and incorporating said substantially dry phosphor and material mixed therewith into said electroluminescent device.

5. The method of processing finely divided electroluminescent phosphor principally comprising zinc sulfide and including copper as activator, after initial preparation and until incorporation into an electroluminescent device, in order to increase the efficiency of the electroluminescent device incorporating the processed phosphor, which method comprises: substantially drying said phosphor; mixing in intimate contact with said phosphor from 0.05% to 25% by weight of substantially dry, finely divided, white, chemically basic and water-sorptive material having an electrical conductivity, both with and without combined water, which is less than the electrical conductivity of zinc sulfide; maintaining said substantially dry phosphor and material mixed therewith under substantially moisture-free conditions; and incorporating said substantially dry phosphor and material mixed therewith into said electroluminescent device.

6. The method of processing finely divided electroluminescent phosphor principally comprising zinc sulfide and including copper as activator, after initial preparation and until incorporation into an electroluminescent device, in order to increase the efficiency of the electroluminescent device incorporating the processed phosphor, which method comprises: substantially drying said phosphor; mixing in intimate contact with said phosphor about 1% by weight of substantially dry, finely divided, white, chemically basic and water-sorptive material having an electrical conductivity, both with and without combined water, which is less than the electrical conductivity of zinc sulfide; maintaining said substantially dry phosphor and material mixed therewith under substantially moisture-free conditions; and incorporating said substantially dry phosphor and material mixed therewith into said electroluminescent device.

7. The method of processing finely divided electroluminescent phosphor principally comprising zinc sulfide and including copper as activator, after initial preparation and until incorporation into an electroluminescent device, in order to increase the efficiency of the electroluminescent device incorporating the processed phosphor, which method comprises: heating said phosphor to substantially dry same; mixing in intimate contact with said phosphor a predetermined amount of at least one substantially dry and finely divided material of the group consisting of magnesium oxide, barium carbonate and cadmium carbonate; maintaining said substantially dry phosphor and material mixed therewith under substantially moisture-free conditions; and incorporating said substantially dry phosphor and material mixed therewith into said electroluminescent device.

8. The method of processing finely divided electroluminescent phosphor principally comprising zinc sulfide and including copper as activator, after initial preparation and until incorporation into an electroluminescent device, in order to increase the efficiency of the electroluminescent device incorporating the processed phosphor, which method comprises: heating said phosphor to substantially dry same; mixing in intimate contact with said phosphor from 0.05% to 25% by weight of substantially dry and finely divided magnesium oxide; maintaining said substantially dry phosphor and magnesium oxide mixed therewith under substantially moisture-free conditions; and incorporating said substantially dry phosphor and magnesium oxide mixed therewith into said electroluminescent device.

9. The method of processing finely divided electroluminescent phosphor principally comprising zinc sulfide and including copper as activator, after initial preparation and until incorporaiton into an electroluminescent device, in order to increase the efficiency of the electroluminescent device incorporating the processed phosphor, which method comprises: heating said phosphor to substantially dry same; mixing in intimate contact with said phosphor about 1% by weight of substantially dry and finely divided barium carbonate; maintaining said substantially dry phosphor and barium carbonate mixed therewith under substantially moisture-free conditions; and incorporating said substantially dry phosphor and barium carbonate mixed therewith into said electroluminescent device.

10. The method of processing finely divided electroluminescent phosphor principally comprising zinc sulfide and including copper as activator, after initial preparation and until incorporation into an electroluminescent device, in order to increase the efficiency of the electroluminescent device incorporating the processed phosphor, which method comprises: substantially drying said phosphor; mixing in intimate contact with said phosphor a predetermined amount of substantially dry and finely divided cadmium carbonate; maintaining said substantially dry phosphor and cadmium carbonate mixed therewith under substantially moisture-free conditions; and incorporating said substantially dry phosphor and cadmium carbonate mixed therewith into said electroluminescent device.

References Cited in the file of this patent
UNITED STATES PATENTS

| | | |
|---|---|---|
| 2,755,406 | Burns | July 17, 1956 |
| 2,773,992 | Ullery | Dec. 11, 1956 |
| 2,817,599 | Edwards | Dec. 24, 1957 |
| 2,854,413 | Geary | Sept. 30, 1958 |